United States Patent
Yoshidome et al.

(10) Patent No.: US 11,587,704 B2
(45) Date of Patent: Feb. 21, 2023

(54) MAGNETIC CORE, MAGNETIC COMPONENT AND ELECTRONIC DEVICE

(71) Applicant: TDK CORPORATION, Tokyo (JP)

(72) Inventors: Kazuhiro Yoshidome, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 112 days.

(21) Appl. No.: 17/209,440

(22) Filed: Mar. 23, 2021

(65) Prior Publication Data
US 2021/0304932 A1    Sep. 30, 2021

(30) Foreign Application Priority Data

Mar. 25, 2020 (JP) .............................. JP2020-054713
Jan. 13, 2021 (JP) .............................. JP2021-003704

(51) Int. Cl.
*C22C 45/02* (2006.01)
*H01F 1/153* (2006.01)
(Continued)

(52) U.S. Cl.
CPC .......... *H01F 1/15333* (2013.01); *B32B 5/02* (2013.01); *B32B 5/16* (2013.01); *B32B 5/18* (2013.01);
(Continued)

(58) Field of Classification Search
CPC ............... H01F 27/255; H01F 1/15333; H01F 1/15308; H01F 1/24; H01F 1/26; H01F 1/15375; H01F 1/15358; H01F 1/12; H01F 1/14; H01F 1/14708; H01F 1/06; H01F 1/20; H01F 1/22; H01F 1/14733; H01F 1/14758; H01F 3/08; C22C 45/02; C22C 45/008; C22C 2200/04; C22C 2202/02;
(Continued)

(56) References Cited

U.S. PATENT DOCUMENTS
2004/0113744 A1    6/2004 Watanabe et al.

FOREIGN PATENT DOCUMENTS
JP    2003-309024 A    10/2003
JP    2004-197218 A    7/2004
(Continued)

OTHER PUBLICATIONS

Machine Translation, Tomofumi, JP 2016-139748 A, Aug. 2016. (Year: 2016).*

*Primary Examiner* — Michael E. La Villa
(74) *Attorney, Agent, or Firm* — Oliff PLC (57) ABSTRACT

To obtain a magnetic core having an improved withstand voltage property while maintaining a high relative magnetic permeability, and the like. The magnetic core contains large particles observed as soft magnetic particles having a Heywood diameter of 5 μm or more and 25 μm or less and small particles observed as soft magnetic particles having a Heywood diameter of 0.5 μm or more and less than 5 μm in a cross section. C1<C2 is satisfied in which an average circularity of the small particles close to the large particles is C1 and an average circularity of all small particles observed in the cross section including small particles not close to the large particles is C2. The small particles close to the large particles are defined as small particles whose distance from centroids of the small particles to a surface of the large particles is 3 μm or less.

13 Claims, 2 Drawing Sheets

(51) Int. Cl.
    *H01F 1/26*         (2006.01)
    *H01F 3/08*         (2006.01)
    *H01F 1/24*         (2006.01)
    *C22C 45/00*       (2023.01)
    *C22C 38/08*       (2006.01)
    *C22C 38/02*       (2006.01)
    *B32B 5/30*         (2006.01)
    *B32B 5/16*         (2006.01)
    *B32B 5/02*         (2006.01)
    *B32B 5/18*         (2006.01)
    *H01F 1/12*         (2006.01)
    *H01F 1/20*         (2006.01)
    *H01F 1/06*         (2006.01)
    *H01F 1/14*         (2006.01)
    *H01F 1/147*       (2006.01)
    *H01F 1/22*         (2006.01)
    *H01F 27/255*     (2006.01)

(52) U.S. Cl.
    CPC ................ *B32B 5/30* (2013.01); *C22C 38/02* (2013.01); *C22C 38/08* (2013.01); *C22C 45/008* (2013.01); *C22C 45/02* (2013.01); *H01F 1/06* (2013.01); *H01F 1/12* (2013.01); *H01F 1/14* (2013.01); *H01F 1/14708* (2013.01); *H01F 1/14733* (2013.01); *H01F 1/14758* (2013.01); *H01F 1/15308* (2013.01); *H01F 1/15358* (2013.01); *H01F 1/20* (2013.01); *H01F 1/22* (2013.01); *H01F 1/24* (2013.01); *H01F 1/26* (2013.01); *H01F 3/08* (2013.01); *C22C 2200/04* (2013.01); *C22C 2202/02* (2013.01); *H01F 1/15375* (2013.01); *H01F 27/255* (2013.01); *Y10T 428/12028* (2015.01); *Y10T 428/12042* (2015.01); *Y10T 428/12049* (2015.01); *Y10T 428/12097* (2015.01); *Y10T 428/12104* (2015.01)

(58) Field of Classification Search
    CPC ........... C22C 38/02; C22C 38/08; B32B 5/16; B32B 5/30; B32B 5/18; B32B 5/02; Y10T 428/12028; Y10T 428/12097; Y10T 428/12049; Y10T 428/12042; Y10T 428/12104
    See application file for complete search history.

(56) References Cited

FOREIGN PATENT DOCUMENTS

| | | |
|---|---|---|
| JP | 2004-363466 A | 12/2004 |
| JP | 5110660 B2 | 12/2012 |
| JP | 2016139748 A * | 8/2016 |

\* cited by examiner

MAGNETIC CORE, MAGNETIC COMPONENT AND ELECTRONIC DEVICE

BACKGROUND OF THE INVENTION

The present invention relates to a magnetic core, a magnetic component, and an electronic device.

Patent Document 1 describes an inductor in which a dust core obtained by pressing a metal magnetic powder and a coil portion are integrally molded. However, when the metal magnetic powder is used, a core loss tends to be large. Here, the core loss is reduced by using an amorphous alloy powder as the metal magnetic powder. However, in this case, it is known that it is difficult to improve a density of the dust core during molding.

Patent Document 2 and Patent Document 3 propose that a powder obtained by mixing a crystalline alloy magnetic powder and an amorphous alloy magnetic powder is used.

Patent Document 4 discloses that an inductor and the like having a core loss lower than that in the related art can be provided by using an amorphous soft magnetic powder having a high average value of practical sphericity.

[Patent Document 1] JP 2003-309024 A
[Patent Document 2] JP 2004-197218 A
[Patent Document 3] JP 2004-363466 A
[Patent Document 4] JP 5110660 B

BRIEF SUMMARY OF INVENTION

An object of the present invention is to obtain a magnetic core and the like having an improved withstand voltage property while maintaining a high relative magnetic permeability.

In order to achieve the above object, a magnetic core according to the present invention contains:

large particles observed as soft magnetic particles having a Heywood diameter of 5 μm or more and 25 μm or less and small particles observed as soft magnetic particles having a Heywood diameter of 0.5 μm or more and less than 5 μm in a cross section, wherein C1<C2 is satisfied, in which an average circularity of the small particles close to the large particles is C1 and an average circularity of all small particles observed in the cross section including the small particles not close to the large particles is C2, and the small particles close to the large particles are defined as small particles whose distance from centroids of the small particles to a surface of the large particles is 3 μm or less.

It has been found that when the large particles and the small particles are contained and the average circularity of the small particles close to the large particles is made smaller than the average circularity of all the small particles, a withstand voltage property of the magnetic core according to the present invention can be improved while maintaining a high relative magnetic permeability thereof as compared with magnetic cores in the related art.

An area ratio of the soft magnetic particles in the cross section may be 75% or more and 90% or less.

In the cross section, a maximum value of a Heywood diameter of a soft magnetic particle other than the large particles and the small particles may be 50 μm or less.

The magnetic core may further contain a resin.

A portion other than magnetic materials may be occupied by the resin, or the resin and voids in the cross section.

An average elliptic circularity of the large particles in the cross section may be 0.930 or more.

The large particles may be amorphous.

The large particles may contain nanocrystals.

The small particles may contain Fe as a main component.

The small particles may contain Fe and at least one selected from Si and Ni as main components.

A magnetic component of the present invention includes the above magnetic core.

An electronic device of the present invention includes the above magnetic core.

DETAILED DESCRIPTION OF INVENTION

Hereinafter, an embodiment of the present invention will be described.

A magnetic core according to the present embodiment contains soft magnetic particles. Then, a total area ratio of the soft magnetic particles to an entire cross section may be 75% or more and 90% or less. When the total area ratio of the soft magnetic particles is 75% or more and 90% or less, it is easy to improve a core strength, a relative magnetic permeability, and a withstand voltage of the magnetic core.

The magnetic core according to the present embodiment contains large particles observed as soft magnetic particles having a Heywood diameter of 5 μm or more and 25 μm or less and small particles observed as soft magnetic particles having a Heywood diameter of 0.5 μm or more and less than 5 μm.

A total area ratio of the large particles to the entire cross section may be 10% or more, or 30% or more. A total area ratio of the small particles may be 5% or more, or 15% or more. When the total area ratio of the large particles is S1 and the total area ratio of the small particles is S2, S1:S2 may be 1:9 to 9:1.

The Heywood diameter is a circle equivalent diameter of a projected area. When an area of a soft magnetic particle in the cross section is S, the Heywood diameter of the soft magnetic particle in the present embodiment is $(4S/\pi)^{1/2}$.

Then, in the magnetic core according to the present embodiment, when an average circularity of the small particles close to the large particles is C1 and an average circularity of all the small particles is C2, C1<C2 is satisfied. C2−C1≥0.001 may be satisfied, C2−C1≥0.010 may be satisfied, and C2−C1≥0.015 may be satisfied.

Figure 1:
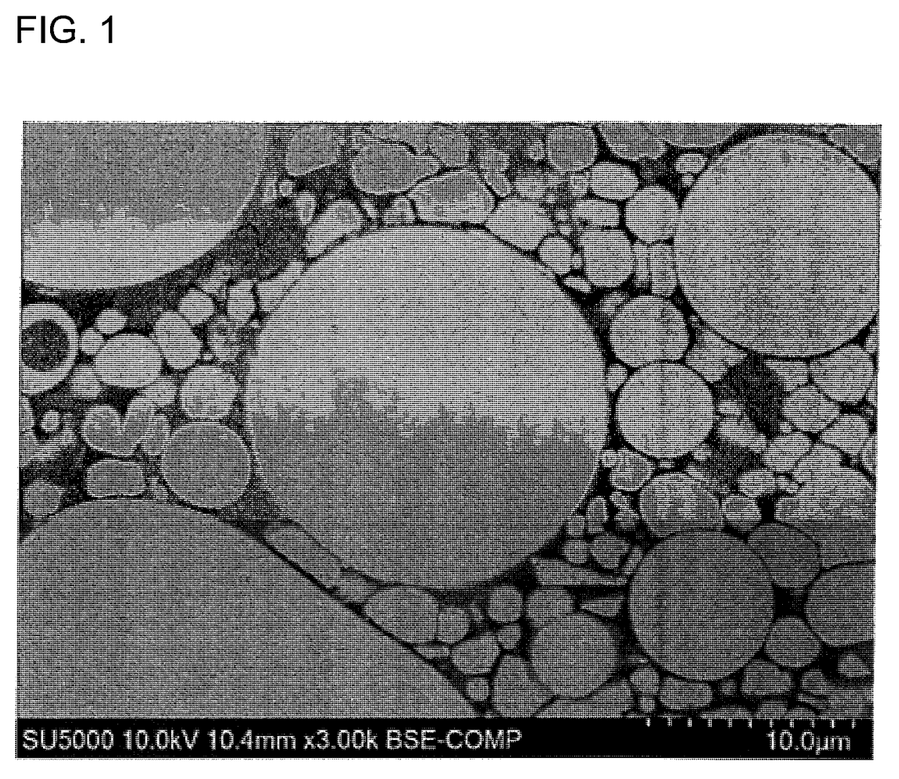
FIG. 1 is an SEM image of a cross section in Example 3.

When C2 is larger than C1, as shown in FIG. 1, the small particles close to the large particles are relatively deformed from a sphere shape. Then, the small particles close to the large particles have a relatively flat shape.

The present inventors have found that the relative magnetic permeability and the withstand voltage property of the magnetic core can be improved while maintaining a magnetic material density by making the small particles close to the large particles among the soft magnetic particles contained in the magnetic core into having a relatively flat shape, compared with magnetic cores in the related art.

Specific values of C1 and C2 are not particularly limited. For C1, 0.600≤C1≤0.970, 0.731≤C1≤0.921, or $0.731 \leq C1 \leq 0.842$. For C2, $0.600 \leq C2 \leq 0.970$, $0.710 \leq C2 \leq 0.970$, or $0.793 \leq C2 \leq 0.900$.

In the present embodiment, the small particles close to the large particles are defined as small particles whose distance from centroids of the small particles to a surface of the large particles is 3 μm or less.

A position of a centroid of each particle can be determined by analyzing a shape of a cross section of each particle by using a common method. The distance from the centroid of the small particles to the surface of the large particles is defined as a distance between the centroid of the small particles and a point on the surface of the large particles that is closest to the centroid of the small particles.

The large particles and the small particles according to the present embodiment may have a covering portion on surfaces thereof. The covering portion may be an insulating coating film. A type of the covering portion is not particularly limited, and any covering portion formed by coating usually used in this technical field may be used. Examples thereof include iron-based oxides, phosphates, silicates (water glass), soda lime glass, borosilicate glass, lead glass, aluminosilicate glass, borate glass, and sulfate glass. Examples of the phosphates include magnesium phosphate, calcium phosphate, zinc phosphate, manganese phosphate, and cadmium phosphate. Examples of the silicates include sodium silicate. A thickness of the covering portion is also not particularly limited. An average thickness of the covering portion formed on the large particle may be 5 nm or more and 100 nm or less. An average thickness of the covering portion formed on the small particles may be 5 nm or more and 100 nm or less. Since the thickness of the covering portion is smaller than the particle diameter of each particle, the thickness of the covering portion may or may not be included in the particle diameter of each particle. Whether the thickness of the covering portion is included in the particle diameter of each particle has substantially no effect on the values of C1, C2, and the like.

The magnetic core according to the present embodiment may contain a resin. A type of the resin is not particularly limited. Examples thereof include a silicone resin and an epoxy resin. A content of the resin in the magnetic core is also not particularly limited. For example, the content may be 1.5 parts by mass or more and 5.0 parts by mass or less, or 1.5 parts by mass or more and 4.5 parts by mass or less with respect to 100 parts by mass of the soft magnetic particles.

Furthermore, portions of the cross section of the magnetic core other than magnetic materials may be occupied by the resin, or the resin and voids. The magnetic materials are mainly the soft magnetic particles, but types of the magnetic materials are not particularly limited. Since the portions other than the magnetic materials are occupied by the resin or the resin and the voids, the withstand voltage property can be easily improved.

An average elliptic circularity of the large particles in the cross section may be 0.93 or more, and more preferably 0.95 or more.

In order to evaluate the shape of the particle, a circularity calculated by $2 \times (\pi \times \text{cross-sectional area})^2/(\text{perimeter of cross section})$ is often used, but in the present embodiment, the shape of the small particles is evaluated by using the circularity, and the shape of the large particles is evaluated by the elliptic circularity. The elliptic circularity is obtained by $4 \times \text{cross-sectional area}/(\text{major axis} \times \text{minor axis} \times \pi)$.

Generally, when the particle is flat, the circularity thereof is low. However, even when the particle is flat, the elliptic circularity thereof is high. Meanwhile, the circularity of the particle may not be low even when the particle has a dented shape or a distorted shape. However, when the particle has a dented shape or a distorted shape, the elliptic circularity thereof is low. When the particle has a shape having large irregularities, both the circularity and the elliptic circularity thereof are low. That is, in order to evaluate whether the particle is deformed other than flat when viewed from a perfect circle, for example, whether the particle has dents, distortions, or irregularities, it is preferable to use the elliptic circularity.

Hereinafter, a method of observing the cross section of the magnetic core will be described.

First, the cross section obtained by cutting the magnetic core is polished to prepare an observation surface. Next, the observation surface is observed by SEM, and an SEM image is taken.

A size of an observation range by SEM is not particularly limited, and any 100 or more, preferably 1000 or more large particles are sufficient for observation. Different observation ranges are set and then an SEM image of each observation range is taken, and the above number of particles may be observed in total of a plurality of SEM images.

A magnification of the SEM image is not particularly limited, and the magnification is sufficient as long as various parameters according to the present embodiment can be measured. For example, the magnification may be 1000 times or more and 5000 times or less.

The withstand voltage property of the magnetic core according to the present embodiment can be improved while maintaining the same relative magnetic permeability as the magnetic cores in the related art since a magnitude relation between the average circularity of the small particles close to the large particles (C1) and the average circularity of all the small particles (C2) is as described above.

Reasons why the withstand voltage property of the magnetic core according to the present embodiment can be improved while maintaining the high relative magnetic permeability thereof as compared with the magnetic cores in the related art will be shown below.

When the soft magnetic particles constituting the magnetic core contain the large particles and the small particles, it is preferable that the large particles have a small number of irregularly shaped particles, that is, particles having dents, distortions, and irregularities. This is because the irregularly shaped particles have protrusions. The protrusions serve as end points, and an electric field tends to concentrate on the protrusions when a voltage is applied. The withstand voltage property of the magnetic core decreases due to the concentration of the electric field on the protrusions.

When the soft magnetic particles have a structure composed of an amorphous material, the soft magnetic particles may contain, for example, a main component having a composition formula $(Fe_{(1-(\alpha+\beta))}X1_\alpha X2_\beta)_{(1-(a+b+c+d+e+f))}M_a B_b P_c Si_d C_e S_f$.

X1 may be one or more selected from the group consisting of Co and Ni.

X2 may be one or more selected from the group consisting of Al, Mn, Ag, Zn, Sn, As, Sb, Cu, Cr, Bi, N, O, and rare earth elements.

M may be one or more selected from the group consisting of Nb, Hf, Zr, Ta, Mo, W, Ti, and V.

$0 \leq a \leq 0.14$,
$0 \leq b \leq 0.20$,
$0 \leq c \leq 0.20$,
$0 \leq d \leq 0.14$,
$0 \leq e \leq 0.20$,
$0 \leq f \leq 0.02$, $0.70 \leq 1-(a+b+c+d+e+f) \leq 0.93$,
$\alpha \geq 0$,
$\beta \geq 0$, and
$0 \leq \alpha+\beta \leq 0.50$
may be satisfied. The above composition formula is expressed by atomic number ratios.

The withstand voltage property of the magnetic core is more likely to be improved when a contact between the soft magnetic particles in the magnetic core is a surface contact, compared to when the contact is a point contact. A contact area between the soft magnetic particles is larger in the case of surface contact than in the case of point contact. Here, the larger the contact area between the soft magnetic particles, the smaller a voltage applied per unit area of a portion where the soft magnetic particles are in contact with each other when the voltage is applied. That is, when the contact between the soft magnetic particles is the surface contact, there are few places where an electric field is concentrated when a voltage is applied. It is considered that the withstand voltage property of the magnetic core is likely to be improved by increasing a frequency of the contact between the soft magnetic particles being the surface contact.

The small particles close to the large particles are preferably flat. This is because when the small particles close to the large particles are flat, the contact area between the soft magnetic particles, particularly the contact area between the large particles and the small particles close to the large particles becomes large. That is, considering only this point, it is preferable that the average circularity of the small particles is small. However, when the circularity of all the small particles is small, small particles other than the small particles close to the large particles are flat. When the soft magnetic particles in the magnetic core are flat, it is considered that an apex in a long axis direction is a protrusion. Then, the protrusion becomes an end point, and the electric field tends to concentrate on the protrusion when a voltage is applied. The withstand voltage property of the magnetic core decreases due to the concentration of the electric field on the protrusion. Therefore, it is difficult to improve the withstand voltage property of the magnetic core only by reducing the circularity of all the small particles, and conversely, the withstand voltage property may decrease.

The present inventors have found that as shown in FIG. 1, when the circularity of the small particles close to the large particles is small compared with the circularity of other small particles, it is possible to achieve both a large contact area between the soft magnetic particles and a small number of places where the electric field is likely to concentrate.

Generally, the magnetic material density of the magnetic core is improved by improving a filling rate of the soft magnetic particles. Then, when the filling rate of the soft magnetic particles is improved, the relative magnetic permeability tends to increase. However, when the filling rate of the soft magnetic particles is improved, a distance between the soft magnetic particles becomes narrower. Therefore, when the filling rate of the soft magnetic particles is improved, the number of the places where the electric field is concentrated increases when a voltage is applied. Accordingly, generally, the withstand voltage property is deteriorated due to the improvement of the filling rate of the soft magnetic particles.

That is, in the related art, the magnetic material density of the magnetic core is improved by improving the filling rate of the soft magnetic particles, and thus the relative magnetic permeability is improved. However, by improving the filling rate of the soft magnetic particles, the withstand voltage property decreases. Therefore, it is difficult to improve the withstand voltage property when the relative magnetic permeability is high. The present inventors have succeeded in improving the relative magnetic permeability and the withstand voltage property by reducing the circularity of the small particles close to the large particles as compared with the circularity of other small particles.

The larger the average elliptic circularity of the large particles, the easier the withstand voltage property of the magnetic core improves. The larger the average elliptic circularity of the large particles, the smaller the number of protrusions in the large particles, and therefore, the number of places where the electric field is concentrated when a voltage is applied decreases. Then, the withstand voltage property is likely to be improved by reducing the places where the electric field is concentrated in the large particles.

The method for calculating the filling rate of the magnetic core is not particularly limited. For example, the above observation surface is observed using SEM. Then, an area ratio of the particles with respect to an area of the entire observation surface is calculated. Then, in the present embodiment, the area ratio and the filling rate are considered to be equal, and the area ratio is defined as the filling rate.

In the cross section, a maximum value of a Heywood diameter of soft magnetic particles that do not correspond to the large particles and the small particles may be 50 μm or less. In other words, the largest Heywood diameter of the soft magnetic particles in the cross section may be 50 μm or less.

The largest Heywood diameter of the soft magnetic particle in the cross section may be 25 μm or less. That is, soft magnetic particles having a Heywood diameter larger than that of the large particles may not be observed in the cross section.

When the maximum value of the Heywood diameter of the soft magnetic particles that do not correspond to the large particles and the small particles exceeds 50 μm, it becomes difficult to improve the withstand voltage property of the magnetic core. This is because when soft magnetic particles having a large Heywood diameter are contained in the magnetic core, the number of portions other than the soft magnetic particles per unit length decreases in a direction in which a voltage is applied. In particular, when portions other than the soft magnetic particles are filled with a resin, and the portions other than the magnetic material in the cross section are occupied by a resin, or the resin and voids, a difference in the withstand voltage property tends to be large between a case where the soft magnetic particles having a large Heywood diameter are contained and a case where the soft magnetic particles having a large Heywood diameter are not contained.

A fine structure inside the soft magnetic particle is not particularly limited. For example, the soft magnetic particles may have a structure containing an amorphous material, or may have a structure composed of crystals. It is preferable that the large particles have a nano-hetero structure in which the amorphous material contains initial microcrystals having an average crystal grain diameter of 0.3 nm or more and 10 nm or less. When the soft magnetic particles have a structure composed of only an amorphous material or a nano-hetero structure, an amorphization rate X described later is 85% or more. When the soft magnetic particles have a structure composed of crystals, the amorphization rate X described later is less than 85%. Under the condition of substantially the same filling rates, in the case where the large particles have the nano-hetero structure, the relative magnetic permeability thereof is improved as compared with that in the case where the large particles have a structure composed of only an amorphous material. Furthermore, it is preferable that the large particles have a structure composed of crystals having an average crystal grain diameter of 1 nm or more and 30 nm or less (a nanocrystal structure) and having a maximum crystal grain diameter of 100 nm or less. Under the condition of substantially the same filling rate, the relative magnetic permeability of the magnetic core in which the large particles have a nanocrystal structure is further improved. The soft magnetic particles containing crystals, especially nanocrystals, usually contain a large number of crystals in one particle. That is, the particle diameter and the crystal grain diameter of the soft magnetic particles are different. A method for calculating the crystal grain diameter is not particularly limited. Examples thereof include a method for calculating the crystal grain diameter by analyzing a half-value width by XRD measurement and evaluating a crystallite size, and a method for calculating the crystal grain diameter by observing crystals using TEM.

Furthermore, the nanocrystals contained in the soft magnetic particles (particularly the large particles) may be Fe-based nanocrystals. The Fe-based nanocrystals are crystals having an average crystal grain diameter of a nano-order (specifically, 0.1 nm or more and 100 nm or less) and a Fe crystal structure of bcc (body-centered cubic lattice structure). A method for calculating the average crystal grain diameter of the Fe-based nanocrystals is not particularly limited. Examples thereof include a method for calculating the crystal grain diameter by analyzing a half-value width by XRD measurement and evaluating a crystallite size, and a method for calculating the crystal grain diameter by observing crystals using TEM. A method for confirming that the crystal structure is bcc is also not particularly limited. Examples thereof include a method for confirming using XRD and a method for confirming by analyzing an electron beam diffraction pattern obtained using TEM.

In the present embodiment, the Fe-based nanocrystals may have an average crystal grain diameter of 1 nm to 30 nm. The soft magnetic particles having a structure composed of such Fe-based nanocrystals tend to have a high saturation magnetic flux density and a low coercive force. That is, the soft magnetic properties are likely to be improved. That is, containing the soft magnetic particles facilitates the magnetic core to have a low coercive force and a high relative magnetic permeability. Furthermore, since the saturation magnetic flux density of the magnetic core containing the soft magnetic particles is increased, a DC bias characteristic of the magnetic core is improved. Accordingly, it is easy to improve the properties of the magnetic core by using the soft magnetic particles having the structure composed of Fe-based nanocrystals.

When the soft magnetic particles have the structure composed of Fe-based nanocrystals, the soft magnetic particle may contain, for example, a main component having a composition formula $(Fe_{(1-(\alpha+\beta))}X1_{\alpha}X2_{\beta})_{(1-(a+b+c+d+e+f))}M_aB_bP_cSi_dC_eS_f$.

X1 may be one or more selected from the group consisting of Co and Ni.

X2 may be one or more selected from the group consisting of Al, Mn, Ag, Zn, Sn, As, Sb, Cu, Cr, Bi, N, O, and rare earth elements.

M may be one or more selected from the group consisting of Nb, Hf, Zr, Ta, Mo, W, Ti, and V.

$0 \leq a \leq 0.14$,
$0 \leq b \leq 0.20$,
$0 \leq c \leq 0.20$,
$0 \leq d \leq 0.14$,
$0 \leq e \leq 0.20$,
$0 \leq f \leq 0.02$,
$0.70 \leq 1-(a+b+c+d+e+f) \leq 0.93$,
$\alpha \geq 0$,
$\beta \geq 0$, and
$0 \leq \alpha+\beta \leq 0.50$
may be satisfied. The above composition formula is expressed by atomic number ratios.

In a method for producing the magnetic core described later, when a soft magnetic metal powder containing the soft magnetic particles having the above composition is heat-treated, the Fe-based nanocrystals are likely to be precipitated from the soft magnetic particles. In other words, the soft magnetic metal particles having the above composition can be easily used as a starting material for the soft magnetic metal powder having the soft magnetic particles from which the Fe-based nanocrystals are precipitated.

When the Fe-based nanocrystals are precipitated from the soft magnetic particles by a heat treatment, the soft magnetic particles before the heat treatment may have the structure composed of only an amorphous material, or may have the nano-hetero structure in which the initial microcrystals are contained in the amorphous material. The initial microcrystals may have an average grain diameter of 0.3 nm or more and 10 nm or less. When the soft magnetic particles have the structure made only of an amorphous material or the nano-hetero structure, the amorphization rate X described later is 85% or more.

It is preferable that small particles contain Fe as a main component. It is preferable to contain Fe and at least one selected from Si and Ni as main components.

Containing Fe as the main component means that a content of Fe in the entire soft magnetic particles is 50 at % or more and 100 at % or less.

Containing Fe and at least one selected from Si and Ni as the main components means that the soft magnetic particles contain at least Fe and at least one selected from Si and Ni, and that a total content of Fe, Si, and Ni in the entire soft magnetic particles is 50 at % or more and 100 at % or less. The content of Fe in this case may be 15 at % or more and 95 at % or less. A total content of Si and Ni may be 3 at % or more and 90 at % or less. Types of elements other than the main components are not particularly limited. For example, Co, Cr, Al, and the like may be contained.

When the small particles have the above composition, it is possible to prepare a magnetic core having a high magnetic property. That is, when the magnetic core contains small particles containing Fe as a main component, it is possible to improve the saturation magnetic flux density of the small particles. Therefore, it is possible to improve the saturation magnetic flux density of the entire magnetic core, and it is possible to improve the DC bias characteristic of the magnetic core. When the magnetic core contains small particles containing Fe and at least one selected from Si and Ni as main components, it is possible to improve the relative magnetic permeability of the small particles. Therefore, it is possible to improve the relative magnetic permeability of the entire magnetic core.

A method for producing the magnetic core according to the present embodiment is shown below, but the method for producing the magnetic core is not limited to the following method.

First, the soft magnetic metal powder containing the soft magnetic particles according to the present embodiment is prepared. The soft magnetic metal powder according to the present embodiment can be obtained by mixing a soft magnetic metal powder most of which eventually becomes large particles and a soft magnetic metal powder most of which eventually becomes small particles.

The soft magnetic metal powder most of which eventually becomes large particles can be prepared by, for example, a gas atomizing method.

In the gas atomizing method, a molten metal obtained by melting a raw metal is pulverized by the gas atomizing method to prepare the soft magnetic metal powder. A composition of the molten metal is the same as a composition of the large particles to be finally obtained. At this time, the molten metal is dropped from a container in which a discharge port is formed toward a cooling unit. A temperature of the molten metal is an injection temperature. The injection temperature is not particularly limited. For example, the injection temperature may be 1200° C. or higher and 1600° C. or lower. The higher the injection temperature, the easier the average circularity approaches 1, and the smaller the average particle diameter, that is, the easier the average elliptic circularity approaches 1.

A gas injection nozzle provided with a gas injection port is arranged so as to surround the discharge port. From the gas injection port, a high-pressure gas (gas having an injection pressure (gas pressure) of 2.0 MPa or more and 10 MPa or less) is injected toward the molten metal dropped through the discharge port. As a result, the molten metal becomes a large number of droplets. By controlling the pressure of the high-pressure gas at this time, the particle diameter of the finally obtained soft magnetic metal powder and the shape of the soft magnetic metal powder can be changed. Specifically, under the condition of the same injection amount of the molten metal, the higher the pressure of the high-pressure gas, the smaller the particle diameter of the finally obtained soft magnetic metal powder. That is, the particle diameter of the soft magnetic metal powder and the shape of the soft magnetic metal powder can be changed by a ratio of the pressure of the high-pressure gas to the injection amount of the molten metal.

As the gas injected from the gas injection port, an inert gas such as nitrogen gas, argon gas, or helium gas, or a reducing gas such as ammonia decomposed gas is preferred. When the molten metal is difficult to oxidize, air may be used.

A shape of the cooling unit into which the molten metal is dropped is not particularly limited, and for example, the cooling unit may be a cylindrical body in which a coolant flow that collides with the molten metal is formed. In this case, by controlling the injection amount of the molten metal, the pressure of the high-pressure gas described above, and a water pressure of the coolant flow, the particle diameter and the average circularity of the large particles in the finally obtained magnetic core can be changed. That is, the particle diameter and the average circularity of the large particles are controlled by controlling a balance among the injection amount of the molten metal, the pressure of the high-pressure gas, and the water pressure of the coolant flow. The injection amount of the molten metal may be 0.5 kg/min or more and 4.0 kg/min or less, and the water pressure may be 5.0 MPa or more and 20.0 MPa or less. Specifically, the larger the injection amount, the larger the particle diameter of the large particles. The smaller the water pressure, the easier the average circularity of the large particles approaches 1, that is, the easier the average elliptic circularity approaches 1.

The molten metal discharged into the coolant flow collides with the coolant flow and is further divided and fined. At the same time, a shape of the fine molten metal is changed, and the molten metal is cooled and solidified so that a solid soft magnetic metal powder is obtained. The soft magnetic metal powder discharged together with the coolant is separated from the coolant and taken out into an external storage tank or the like. A type of the coolant is not particularly limited. For example, cooling water may be used. When the coolant is not used, the soft magnetic metal powder most of which eventually becomes large particles tends to contain coarse crystals having a crystal grain diameter of more than 100 nm.

The obtained soft magnetic metal powder may be heat-treated. Heat treatment conditions are not particularly limited. For example, the heat treatment may be performed at 400° C. to 700° C. for 0.1 to 10 hours. By performing the heat treatment, when the fine structure of the particles is the structure composed of only an amorphous material or the nano-hetero structure in which initial microcrystals are contained in the amorphous material, the fine structure of the particles tends to be a structure containing nanocrystals. Then, the coercive force of the soft magnetic metal powder tends to decrease. When the temperature of the heat treatment is too high, the coercive force of the soft magnetic metal powder tends to increase.

A method for confirming the fine structure of the soft magnetic metal powder is not particularly limited. For example, confirmation can be made by using XRD. The fine structure of the soft magnetic metal powder before pressing and the fine structure of the particles contained in the magnetic core after pressing are usually the same.

In the present embodiment, the soft magnetic metal powder having an amorphization rate X of 85% or more represented by the following formula (1) has the structure composed of only an amorphous material or the nano-hetero structure, and the soft magnetic metal powder having an amorphization rate X of less than 85% has the structure composed of crystals.

$$X = 100 - (Ic/(Ic+Ia) \times 100) \tag{1}$$

Ic: scattering integrated intensity of crystal phase
Ia: scattering integrated intensity of amorphous phase The amorphization rate X is calculated according to the above formula (1) by performing X-ray crystal structure analysis on the soft magnetic metal powder by using XRD to identify a phase, reading a peak (Ic: scattering integrated intensity of crystal phase, Ia: scattering integrated intensity of amorphous phase) of crystallized Fe or a crystallized compound, and calculating a crystallization rate based on the peak intensities. Hereinafter, the calculation method will be described in more detail.

Figure 2:
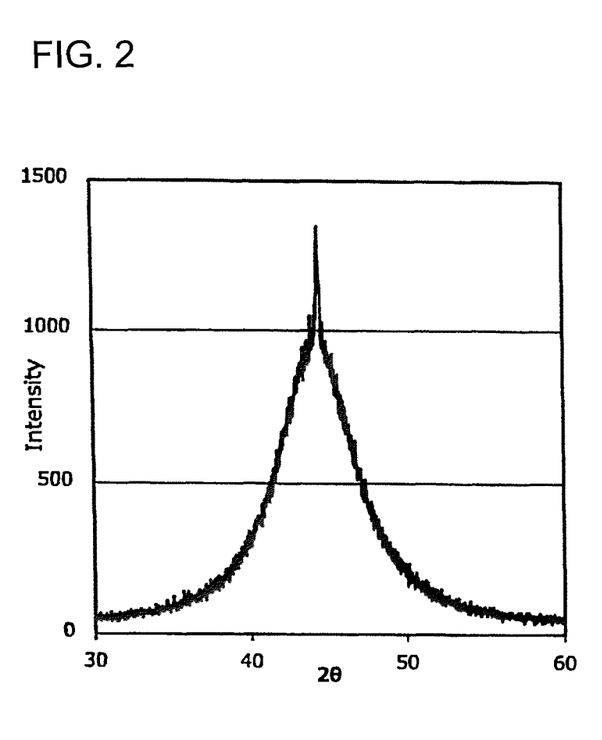
FIG. 2 is an example of a chart obtained by X-ray crystal structure analysis.
Figure 3:
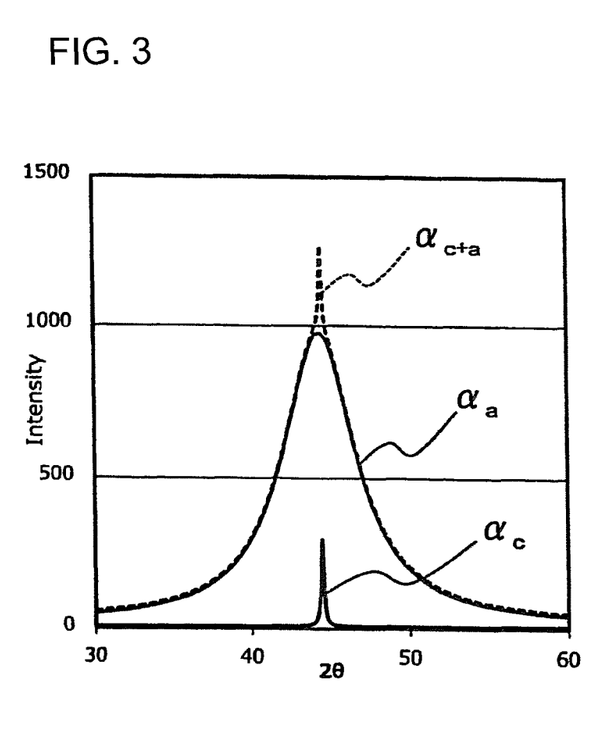
FIG. 3 is an example of a pattern obtained by profile fitting the chart shown in FIG. 2.

The X-ray crystal structure analysis is performed by using XRD on the soft magnetic metal powder according to the present embodiment, and a chart as shown in FIG. 2 is obtained. The chart is profile-fitted using a Lorentz function represented by the following formula (2) to obtain a crystal component pattern $\alpha_c$ showing the scattering integrated intensity of crystal phase, an amorphous component pattern $\alpha_a$ showing the scattering integrated intensity of amorphous phase, and a combined pattern thereof $\alpha_{c+a}$, as shown in FIG. 3. From the scattering integrated intensity of crystal phase and the scattering integrated intensity of amorphous phase of the obtained patterns, the amorphization rate X is obtained according to the above formula (1). A measurement range is set to a diffraction angle $2\theta = 30°$ to $60°$ where amorphous-derived halos can be confirmed. Within this range, an error between the integrated intensities actually measured by using XRD and the integrated intensities calculated using the Lorentz function can be within 1%.

$$f(x) = \frac{h}{1 + \frac{(x-u)^2}{w^2}} + b \quad (2)$$

h: peak height
u: peak position
w: half-value width
b: background height

The soft magnetic metal powder most of which eventually becomes small particles is produced by various powdering methods such as a liquid phase method, a spray pyrolysis method, and a melting method.

The circularity thereof can be changed by further treating the obtained soft magnetic metal powder with a ball mill. Specifically, the soft magnetic metal powder can be deformed by the treatment with a ball mill, and the average circularity of the small particles contained in the finally obtained magnetic core can be increased. The longer a treatment time with the ball mill, the more the soft magnetic metal powder is deformed.

The average particle diameter of the soft magnetic metal powder most of which eventually becomes small particles can be controlled by appropriately removing a coarse powder and/or a fine powder using an air flow classifier.

For each of the above soft magnetic metal powders, a covering portion may be formed at this time. A method for forming the covering portion is not particularly limited.

When producing a magnetic core from the soft magnetic metal powder according to the present embodiment, first, the soft magnetic metal powder most of which eventually becomes large particles and the soft magnetic metal powder most of which eventually becomes small particles are mixed. A mixing method is not particularly limited. A mixing ratio of the soft magnetic metal powder most of which eventually becomes large particles to the soft magnetic metal powder most of which eventually becomes small particles may be, for example, 9:1 to 1:9 by mass ratio.

Examples of a method for making the average circularity of the small particles close to the large particles (C1) smaller than the average circularity of all the small particles (C2) include the following method. First, in the method for producing a magnetic core according to the present embodiment, two or more kinds of soft magnetic metal powders most of which eventually become small particles (hereinafter, may be referred to as a small particle powder) having different average circularities, are produced. Furthermore, at the time of the above mixing, first, the soft magnetic metal powder most of which eventually becomes large particles (hereinafter, may be referred to as a large particle powder) is mixed with a powder having a smaller average circularity among the soft magnetic metal powders most of which eventually become small particles (hereinafter, may be referred to as a small-circularity small particle powder). Next, a powder having a larger average circularity among the soft magnetic metal powders most of which eventually become small particles (hereinafter, may be referred to as a large-circularity small particle powder) is added and mixed. By mixing the soft magnetic metal powders with each other in this way, the average circularity of the small particles close to the large particles (C1) in the finally obtained magnetic core can be made smaller than the average circularity of all the small particles (C2). This is because the small-circularity small particle powder adheres to the large particle powder by mixing the large particle powder with the small-circularity small particle powder.

A mixing ratio of the small-circularity small particle powder to the large-circularity small particle powder is not particularly limited. For example, a mass ratio of the small-circularity small particle powder to the large-circularity small particle powder may be 1:9 to 9:1.

Next, a resin may be further added to the mixed soft magnetic metal powder if necessary. A ratio of the resin to the entire magnetic core may be 1.5 mass % or more and 5.0 mass % or less, or may be 1.5 mass % or more and 4.5 mass % or less. Furthermore, the powder to which the resin is added and mixed may be granulated. The smaller the amount of the resin, the more difficult the compression mold of the soft magnetic metal powder. The strength of the magnetic core obtained by compression mold of the soft magnetic metal powder tends to be insufficient. When the strength of the magnetic core is insufficient, it is difficult to handle the magnetic core.

Then, the obtained powder is filled in a mold and compression molding is performed to obtain the magnetic core. The compression molding may be performed at a molding pressure of 1 t/cm$^2$ or more and 8 t/cm$^2$ or less, for example. By changing the molding pressure, the filling rate of the soft magnetic particles can be controlled, and the magnetic material area in the cross section can be controlled.

Although the magnetic core according to the present embodiment has been described above, the magnetic core of the present invention is not limited to the above embodiment.

Applications of the magnetic core of the present invention are also not particularly limited. Examples thereof include coil components (magnetic components) such as an inductor, a choke coil, and a transformer. Furthermore, an electronic device using the magnetic core of the present invention, for example, a DC-DC converter and the like is mentioned.

EXAMPLES

Hereinafter, the present invention will be described based on more detailed Examples, but the present invention is not limited to these Examples.

Experimental Example 1

In Experimental Example 1, each soft magnetic metal powders most of which eventually became large particles (large particle powder) was prepared by the gas atomizing method. The composition thereof was $Fe_{0.800}Nb_{0.070}B_{0.098}P_{0.030}S_{0.002}$.

At this time, atomizing conditions were controlled so that a number-based average particle diameter (D50) of each of the obtained soft magnetic metal powders was appropriately controlled to be 10.3 μm. Specifically, the injection amount of the molten metal was set to 1.2 kg/min, the injection temperature was set to 1500° C., the gas pressure was set to 7.0 MPa, and the water pressure was set to 10.0 MPa.

Then, the obtained soft magnetic metal powder was heat-treated. The heat treatment conditions were 600° C. for 1 hour, and the atmosphere during the heat treatment was an Ar atmosphere.

It was confirmed that the number-based average particle diameter (D50) of the obtained soft magnetic metal powder was 10.3 μm. The number-based average particle diameter was measured using a Morphorogi G3. The nanocrystal structure of each soft magnetic metal powder was confirmed using XRD and STEM. After preparing the magnetic core by a method described later using only the obtained soft magnetic metal powder, the cross section of the magnetic core was observed using SEM at a size of 10 or more soft magnetic particles. Observation using SEM was repeated so that a total of 100 or more soft magnetic particles were observed. Then, Heywood diameters of 100 or more soft magnetic particles were measured. As a result, the average particle diameter (D50) of the soft magnetic particles was 7.5 μm. Since the soft magnetic metal powder was cut anywhere when cutting the cross section of the magnetic core, the average particle diameter of the soft magnetic particles measured by observing the cross section of the magnetic core is smaller than the average particle diameter of the actual soft magnetic metal powder.

Each of the soft magnetic metal powders most of which eventually became small particles (small particle powder) was prepared by the spray pyrolysis method. The composition of the small particle powder in each Example and Comparative Example was shown in Table 1. The average particle diameter (D50) of the small particle powders was controlled to be 1.5 μm by appropriately removing the coarse powder and/or the fine powder using the air flow classifier. At this time, the small particle powder had a shape close to a true sphere. After the magnetic core was produced using this obtained small particle powder by a method described later, the cross section of the magnetic core was observed using SEM at a size of 10 or more soft magnetic particles. Observation using SEM was repeated so that a total of 100 or more soft magnetic particles were observed. Then, Heywood diameters of 100 or more soft magnetic particles were measured. As a result, the average particle diameter (D50) of the soft magnetic particles was 1.1 μm.

Next, a part of the small particle powders with a ball mill, to prepare the small-circularity small particle powder. The treatment time was 60 minutes. The small particle powder not treated with a ball mill was considered to have a treatment time of 0 minute. Then, the small particle powder having the shorter treatment time with a ball mill is the large-circularity small particle powder, and the small particle powder having the longer treatment time with a ball mill is the small-circularity small particle powder.

Then, zinc phosphate was used to form a covering portion having an average thickness of 20 nm on the large particle powder. In addition, zinc phosphate was used to form a covering portion having an average thickness of 10 nm on the small particle powder.

Next, the large particle powder and the small particle powder were mixed.

In Method 1, one kind small particle powder having a treatment time of 0 minute was prepared, and the large particle powder and the small particle powder were simply mixed. A mass ratio of the large particle powder to the small particle powder was set to 8:2.

In Method 2, first, the large particle powder and the small-circularity small particle powder having a treatment time of 60 minutes were mixed. Next, the large-circularity small particle powder having a treatment time of 0 minute was added and mixed. A mass ratio of the large particle powder to the small-circularity small particle powder to the large-circularity small particle powder was set to 8:0.5:1.5.

Which method in Method 1 and Method 2 was used for mixing for each sample is shown in Table 1.

Furthermore, an epoxy resin was diluted and added so that an amount of the resin was as shown in Table 1 with respect to 100 parts by mass of the soft magnetic metal powder obtained by the mixing described above. Then, agglomerates obtained by kneading with a kneader and drying were sized to have an average particle diameter of 355 μm or less in a volume particle diameter distribution to obtain granules. The granules were filled in a mold. The mold had a shape of making the shape of the finally obtained magnetic core to be toroidal.

Next, the soft magnetic metal powder was pressure molded. The molding pressure was controlled so that the ratio of the magnetic material area in the cross section of the magnetic core obtained in this case was as shown in Table 1. Specifically, the molding pressure was controlled in a range of 1 to 8 t/cm$^2$.

For each Experimental Example, a cross section cut parallel to a molding direction (height direction) was observed. Specifically, an observation range was set so that 10 or more large particles could be seen using SEM. The magnification was 1000 times. For each Experimental Example, it was confirmed that the area ratio of the large particles to the total soft magnetic particles contained in the magnetic core was 10% or more, and the area ratio of the small particles to the total soft magnetic particles contained in the magnetic core was 10% or more.

Then, the average circularity of the large particles, the average circularity of the small particles (C1 and C2), the maximum value of the Heywood diameter of the soft magnetic particles, the ratio of the magnetic material area, the relative magnetic permeability, and the withstand voltage property in the magnetic core of each Experimental Example were measured. The C1 and C2, the average elliptic circularity of the large particles, the maximum value of the Heywood diameter, and the filling rate of each magnetic core were calculated based on SEM images. The relative magnetic permeability was measured using impedance/GAIN-PHASE ANALYZER (4194A manufactured by Yokogawa Hewlett-Packard Co., Ltd.). A case where the relative magnetic permeability was higher than 40 was evaluated as good. The average elliptic circularity of the large particles was 0.98 in all the samples of Experimental Example 1.

For the withstand voltage property of each magnetic core, a pair of In—Ga electrodes was formed on the magnetic core, the pair of In—Ga electrodes was sandwiched between a pair of copper plates, a voltage was applied to the pair of copper plates, and a voltage when a current of 1 mA flowed was evaluated. Results are shown in Table 1.

Furthermore, for Experimental Examples whose production methods other than the composition of the small particles and the mixing method are the same as each other, the ratio of the withstand voltage property of Experimental Example obtained by the mixing using Method 2 with respect to the withstand voltage property of Experimental Example obtained by the mixing using Method 1 was calculated as a withstand voltage property ratio. Results are shown in Table 1. When the withstand voltage property ratio was 1.5 or more, the withstand voltage was evaluated as good, and when the withstand voltage property ratio was 1.8 or more, the withstand voltage was evaluated as better.

| Sample No. | Example/ Comparative Example | Mixing method | Composition of small particle powder | Resin amount Part by mass | Average circularity of small particles C1 | Average circularity of small particles C2 | Maximum value of Heywood diameter μm | Ratio of magnetic material area permeability | Relative magnetic material area | Withstand voltage property V/mm | Withstand voltage property ratio |
|---|---|---|---|---|---|---|---|---|---|---|---|
| 1a | Comparative Example | Method 1 | $Fe_{57.1}Si_{28.6}Cr_{14.3}$ | 3.0 | 0.972 | 0.972 | 20.0 | 81.2 | 51 | 52 | — |
| 1 | Example | Method 2 | $Fe_{57.1}Si_{28.6}Cr_{14.3}$ | 3.0 | 0.959 | 0.969 | 20.0 | 82.1 | 53 | 80 | 1.5 |
| 2a | Comparative Example | Method 1 | $Ni_{80}Fe_{20}$ | 3.0 | 0.942 | 0.942 | 20.0 | 80.2 | 50 | 51 | — |
| 2 | Example | Method 2 | $Ni_{80}Fe_{20}$ | 3.0 | 0.921 | 0.936 | 20.0 | 80.4 | 52 | 94 | 1.8 |
| 3a | Comparative Example | Method 1 | Fe | 3.0 | 0.823 | 0.823 | 20.0 | 80.3 | 51 | 54 | — |
| 3 | Example | Method 2 | Fe | 3.0 | 0.732 | 0.801 | 20.0 | 82.1 | 55 | 121 | 2.2 |
| 4a | Comparative Example | Method 1 | Fe | 2.5 | 0.823 | 0.823 | 20.0 | 83.6 | 53 | 40 | — |
| 4 | Example | Method 2 | Fe | 2.5 | 0.732 | 0.793 | 20.0 | 85.1 | 58 | 82 | 2.1 |
| 5a | Comparative Example | Method 1 | Fe | 1.5 | 0.823 | 0.823 | 20.0 | 90.2 | 57 | 32 | — |
| 5 | Example | Method 2 | Fe | 1.5 | 0.733 | 0.799 | 20.0 | 90.0 | 63 | 71 | 2.2 |
| 6a | Comparative Example | Method 1 | Fe | 4.5 | 0.823 | 0.823 | 20.0 | 75.2 | 44 | 94 | — |
| 6 | Example | Method 2 | Fe | 4.5 | 0.733 | 0.795 | 20.0 | 75.3 | 45 | 180 | 1.9 |

According to Table 1, each Example satisfying C1<C2 had an improved withstand voltage property as compared with each Comparative Example similar to each Example except for satisfying C1=C2. In particular, when C2−C1≥0.015 is satisfied, the withstand voltage property was particularly improved.

Experimental Example 2

Experimental Example 2 was carried out under the same conditions as Experimental Example 1 except that various small particle powders were prepared under conditions shown in Table 2.

Experimental Example 3

In Sample Nos. 11, 11a, 12, and 12a of Experimental Example 3, the injection amount of the molten metal and the water pressure when producing a large particle powder from Sample Nos. 3 and 3a of Experimental Example 1 were changed. Specific values are shown in Table 3. Then, the average circularity of each of the large particles in the finally obtained magnetic cores was the value shown in Table 3. For Sample Nos. 13 and 13a of Experimental Example 3, the same conditions were used except that the large particle powders from Sample Nos. 3 and 3a of Experimental Example 1 were not heat-treated at 600° C. for 1 hour. It was

| Sample No. | Example/ Comparative Example | Mixing method | Composition of small particle powder | Resin amount Part by mass | Ball mill treatment time for small particles/min Small-circularity small particle powder | Ball mill treatment time for small particles/min Large-circularity small particles powder | Average circularity of small particles C1 | Average circularity of small particles C2 | Maximum value of Heywood diameter μm | Ratio of magnetic material area permeability | Relative magnetic material area | Withstand voltage property V/mm | Withstand voltage property ratio |
|---|---|---|---|---|---|---|---|---|---|---|---|---|---|
| 2a | Comparative Example | Method 1 | $Ni_{80}Fe_{20}$ | 3.0 | 0 | | 0.942 | 0.942 | 20.0 | 80.2 | 50 | 51 | — |
| 2 | Example | Method 2 | $Ni_{80}Fe_{20}$ | 3.0 | 60 | 0 | 0.921 | 0.936 | 20.0 | 80.4 | 52 | 94 | 1.8 |
| 2b | Comparative Example | Method 1 | $Ni_{80}Fe_{20}$ | 3.0 | | 60 | 0.921 | 0.921 | 20.0 | 80.3 | 48 | 45 | — |
| 2c | Example | Method 2 | $Ni_{80}Fe_{20}$ | 3.0 | 120 | 60 | 0.842 | 0.900 | 20.0 | 80.3 | 49 | 92 | 2.0 |
| 2d | Comparative Example | Method 1 | $Ni_{80}Fe_{20}$ | 3.0 | | 120 | 0.842 | 0.842 | 20.0 | 80.3 | 45 | 40 | — |
| 2e | Example | Method 2 | $Ni_{80}Fe_{20}$ | 3.0 | 120 | 180 | 0.733 | 0.811 | 20.0 | 80.5 | 48 | 78 | 2.0 |
| 2f | Comparative Example | Method 1 | $Ni_{80}Fe_{20}$ | 3.0 | | 180 | 0.733 | 0.733 | 20.0 | 80.3 | 45 | 32 | — |
| 2g | Example | Method 2 | $Ni_{80}Fe_{20}$ | 3.0 | 240 | 180 | 0.651 | 0.71 | 20.0 | 80.4 | 48 | 68 | 2.1 |
| 2h | Comparative Example | Method 1 | $Ni_{80}Fe_{20}$ | 3.0 | | 240 | 0.651 | 0.651 | 20.0 | 80.4 | 44 | 34 | — |
| 2i | Example | Method 2 | $Ni_{80}Fe_{20}$ | 3.0 | 300 | 240 | 0.600 | 0.642 | 20.0 | 80.5 | 45 | 54 | 1.6 |

According to Table 2, each Example satisfying C1<C2 had an improved withstand voltage property as compared with each Comparative Example similar to each Example except for satisfying C1=C2. In other words, even when C1 and C2 were changed, the withstand voltage property was improved when C1<C2 was satisfied.

confirmed using XRD and STEM that the large particle powders of Sample Nos. 11, 11a, 12, and 12a had a structure made of nanocrystals, and the large particle powders of Samples No. 13 and 13a had a structure made only of an amorphous material. For each Experimental Example, it was confirmed that the area ratio of the large particles to the total soft magnetic particles contained in the magnetic core was 10% or more, and the area ratio of the small particles was 10% or more. Results are shown in Table 3.

| Sample No. | Example/ Comparative Example | Mixing method | Fine structure particles of large | Injection amount of molten metal kg/min | Water pressure MPa | Average of large particles elliptic circularity | Average circularity of small particles C1 | | Maximum value of Heywood diameter pm | Ratio of magnetic material area % | Relative magnetic permea- bility | With- stand voltage property V/mm | With- stand voltage property ratio |
|---|---|---|---|---|---|---|---|---|---|---|---|---|---|
| | | | | | | | C1 | C2 | | | | | |
| 3a | Comparative Example | Method 1 | Nanocrystal | 1.2 | 10.0 | 0.98 | 0.823 | 0.823 | 20.0 | 80.3 | 51 | 54 | — |
| 3 | Example | Method 2 | Nanocrystal | | | 0.98 | 0.731 | 0.803 | 20.0 | 82.1 | 55 | 121 | 2.2 |
| 11a | Comparative Example | Method 1 | Nanocrystal | 1.3 | 12.5 | 0.95 | 0.823 | 0.823 | 20.5 | 79.6 | 49 | 53 | — |
| 11 | Example | Method 2 | Nanocrystal | | | 0.95 | 0.731 | 0.803 | 20.5 | 81.2 | 53 | 98 | 1.8 |
| 12a | Comparative Example | Method 1 | Nanocrystal | 1.4 | 15.0 | 0.93 | 0.823 | 0.823 | 20.4 | 79.3 | 50 | 48 | — |
| 12 | Example | Method 2 | Nanocrystal | | | 0.93 | 0.731 | 0.803 | 20.4 | 80.9 | 54 | 82 | 1.7 |
| 13a | Comparative Example | Method 1 | Amorphous | 1.2 | 10.0 | 0.98 | 0.823 | 0.823 | 20.1 | 80.6 | 47 | 56 | — |
| 13 | Example | Method 2 | Amorphous | | | 0.98 | 0.731 | 0.803 | 20.3 | 81.3 | 49 | 123 | 2.2 |

According to Table 3, even when the average elliptic circularity of the large particles and the fine structure of the large particles were changed, each Example satisfying $C1<C2$ had an improved withstand voltage property as compared with each Comparative Example similar to each Example except for satisfying $C1=C2$. Furthermore, the withstand voltage property of Sample Nos. 3 and 11 having an average elliptic circularity of 0.95 or more for the large particles was improved as compared with Sample No. 12 having an average elliptic circularity of 0.93 for the large particles.

Experimental Example 4

In Experimental Example 4, by changing the injection amount of the molten metal and the water pressure when producing the large particle powders from Sample Nos. 3 and 3a of Experimental Example 1, the average particle diameter of the large particle powder and the average elliptic circularity of the large particles in the magnetic core were changed to values shown in Table 4. It was confirmed using XRD and STEM that the large particle powder of each sample had a structure made only of nanocrystals. For each Experimental Example, it was confirmed that the area ratio of the large particles to the total soft magnetic particles contained in the magnetic core was 10% or more, and the area ratio of the small particles was 10% or more. Results are shown in Table 4.

| Sample No. | Example/ Comparative Example | Mixing method | Injection amount of molten metal kg/min | Water pressure MPa | Average of large particles elliptic circularity | Average particle diameter of large particle powder μm | Average circularity of small particles C1 | | Maximum value of Heywood diameter pm | Ratio of magnetic material area % | Relative magnetic permeability | With- stand voltage property V/mm | With- stand voltage property ratio |
|---|---|---|---|---|---|---|---|---|---|---|---|---|---|
| | | | | | | | C1 | C2 | | | | | |
| 21a | Comparative Example | Method 1 | 1.2 | 10 | 0.95 | 5.3 | 0.823 | 0.823 | 12.5 | 79.8 | 48 | 56 | — |
| 21 | Example | Method 2 | | | 0.95 | 5.3 | 0.731 | 0.803 | 12.5 | 80.2 | 50 | 110 | 2.0 |
| 3a | Comparative Example | Method 1 | 1.2 | 7 | 0.98 | 10.3 | 0.823 | 0.823 | 20.0 | 80.3 | 51 | 54 | — |
| 3 | Example | Method 2 | | | 0.98 | 10.3 | 0.731 | 0.803 | 20.0 | 82.1 | 55 | 121 | 2.2 |
| 22a | Comparative Example | Method 1 | 1.3 | 5 | 0.96 | 14.8 | 0.823 | 0.823 | 32.1 | 78.9 | 49 | 45 | — |
| 22 | Example | Method 2 | | | 0.96 | 14.8 | 0.731 | 0.803 | 32.1 | 81.3 | 52 | 86 | 1.9 |
| 23a | Comparative Example | Method 1 | 1.4 | 3 | 0.95 | 19.9 | 0.823 | 0.823 | 39.8 | 78.3 | 49 | 36 | — |
| 23 | Example | Method 2 | | | 0.95 | 19.9 | 0.731 | 0.803 | 39.8 | 80.9 | 52 | 75 | 2.1 |
| 24a | Comparative Example | Method 1 | 1.6 | 3 | 0.95 | 25.2 | 0.823 | 0.823 | 49.8 | 80.2 | 52 | 29 | — |
| 24 | Example | Method 2 | | | 0.95 | 25.2 | 0.731 | 0.803 | 49.8 | 81.3 | 54 | 63 | 2.2 |
| 25a | Comparative Example | Method 1 | 2.0 | 3 | 0.94 | 30.2 | 0.823 | 0.823 | 62.0 | 80.3 | 53 | 28 | — |
| 25 | Example | Method 2 | | | 0.94 | 30.2 | 0.731 | 0.803 | 62.0 | 81.3 | 55 | 54 | 1.9 |

According to Table 4, even when the average particle diameter of the large particles and the average elliptic circularity of the large particles were changed, each Example satisfying $C1<C2$ had an improved withstand voltage property as compared with each Comparative Example similar to each Example except for satisfying $C1=C2$. In addition, Sample Nos. 3 and 21 to 24 had a withstand voltage property higher than that of Sample No. 25, which had a maximum Heywood diameter of more than 50 μm.

Experimental Example 5

In Experimental Example 5, Sample Nos. 3 and 3a were prepared under the same conditions except that the coating thickness of each particle was changed by changing the amount of zinc phosphate added. Results are shown in Table 5.

TABLE 5

| Sample No. | Example/ Comparative Example | Average circularity of small particle C1 | | Coating thickness of large particles nm | Coating thickness of small particles nm | Ratio of magnetic material area % | Relative magnetic permeability | Withstand voltage property V/mm | Withstand voltage property ratio |
|---|---|---|---|---|---|---|---|---|---|
| | | C1 | C2 | | | | | | |
| 31a | Comparative Example | 0.823 | 0.823 | 10 | 10 | 82.3 | 54 | 45 | — |
| 31 | Example | 0.731 | 0.803 | 10 | 10 | 81.8 | 58 | 84 | 1.9 |
| 3a | Comparative Example | 0.823 | 0.823 | 20 | 10 | 80.3 | 51 | 54 | — |
| 3 | Example | 0.731 | 0.803 | 20 | 10 | 82.1 | 55 | 121 | 2.2 |
| 32a | Comparative Example | 0.823 | 0.823 | 30 | 10 | 81.3 | 50 | 67 | — |
| 32 | Example | 0.731 | 0.803 | 30 | 10 | 82.1 | 50 | 132 | 2.0 |
| 33a | Comparative Example | 0.823 | 0.823 | 53 | 10 | 81.4 | 47 | 68 | — |
| 33 | Example | 0.731 | 0.803 | 53 | 10 | 81.3 | 48 | 148 | 2.2 |
| 34a | Comparative Example | 0.823 | 0.823 | 100 | 10 | 81.2 | 43 | 72 | — |
| 34 | Example | 0.731 | 0.803 | 100 | 10 | 81.4 | 46 | 154 | 2.1 |
| 35a | Comparative Example | 0.823 | 0.823 | 20 | 5 | 82.3 | 54 | 51 | — |
| 35 | Example | 0.731 | 0.803 | 20 | 5 | 82.1 | 56 | 101 | 2.0 |
| 36a | Comparative Example | 0.823 | 0.823 | 20 | 20 | 81.2 | 49 | 63 | — |
| 36 | Example | 0.731 | 0.803 | 20 | 20 | 80.1 | 50 | 132 | 2.1 |
| 37a | Comparative Example | 0.823 | 0.823 | 20 | 30 | 81.2 | 43 | 71 | — |
| 37 | Example | 0.731 | 0.803 | 20 | 30 | 80.3 | 46 | 143 | 2.0 |
| 38a | Comparative Example | 0.823 | 0.823 | 20 | 50 | 80.3 | 41 | 85 | — |
| 38 | Example | 0.731 | 0.803 | 20 | 50 | 80.4 | 44 | 167 | 2.0 |

According to Table 5, the same tendency was observed even when the coating thickness was changed. The larger the coating thickness, the better the withstand voltage property, but the lower the relative magnetic permeability.

Experimental Example 6

In Experimental Example 6, a crystal structure of the soft magnetic metal powder most of which eventually became large particles was changed by controlling the composition and atomizing conditions thereof. The composition and the crystal structure are shown in Table 6. Specifically, the atomizing conditions of Sample Nos. 39 and 39a were the same as the atomizing conditions of Sample Nos. 3a and 3. The atomizing conditions of Sample Nos. 40a and 40 were the same as those of Sample Nos. 3a and 3 except that cooling water was not sprayed. No heat treatment was performed on Samples Nos. 39a, 39, 40a, and 40. Other points were the same as in Experimental Example 1. The composition of the large particles was described in terms of an atomic number ratio. Results are shown in Table 6.

| Sample No. | Example/ Comparative Example | Mixing method | Composition of large particle | Fine structure of large particles | Injection amount of molten metal kg/min | Water pressure MPa | Average of large particles elliptic circularity | Average circularity of small particles C1 | | Maximum value of Heywood diameter pm | Ratio of magnetic material area % | Relative magnetic permeability | Withstand voltage property V/mm | Withstand voltage property ratio |
|---|---|---|---|---|---|---|---|---|---|---|---|---|---|---|
| | | | | | | | | C1 | C2 | | | | | |
| 3a | Comparative Example | Method 1 | $Fe_{0.8000}ND_{0.070}B_{0.098}P_{0.030}S_{0.002}$ | Nano-crystal | 1.2 | 10.0 | 0.98 | 0.823 | 0.823 | 20.0 | 80.3 | 51 | 54 | — |
| 3 | Example | Method 2 | $Fe_{0.8000}ND_{0.070}B_{0.098}P_{0.030}S_{0.002}$ | Nano-crystal | | | 0.98 | 0.731 | 0.803 | 20.0 | 82.1 | 55 | 121 | 2.2 |
| 39a | Comparative Example | Method 1 | $Fe_{0.725}B_{0.110}Si_{0.120}Cr_{0.025}C_{0.020}$ | Amorphous | 1.2 | 10.0 | 0.98 | 0.823 | 0.823 | 21.2 | 80.1 | 44 | 51 | — |
| 39 | Example | Method 2 | $Fe_{0.725}B_{0.110}Si_{0.120}Cr_{0.025}C_{0.020}$ | Amorphous | | | 0.98 | 0.731 | 0.803 | 21.3 | 82.2 | 48 | 98 | 1.9 |
| 40a | Comparative Example | Method 1 | $Fe_{0.8950}Si_{0.060}Cr_{0.0450}$ | Crystal | 1.2 | — | 0.98 | 0.823 | 0.823 | 21.2 | 80.1 | 40 | 44 | — |
| 40 | Example | Method 2 | $Fe_{0.8950}Si_{0.060}Cr_{0.0450}$ | Crystal | | | 0.98 | 0.731 | 0.803 | 21.3 | 82.2 | 43 | 78 | 1.8 |

According to Table 6, each Example satisfying C1<C2 had an improved withstand voltage property as compared with each Comparative Example similar to each Example except for satisfying C1=C2. In the case of Example (Sample No. 39) in which the fine structure of the large particles was made only of an amorphous material, and Example (Sample No. 40) in which the fine structure of the large particles was a structure made of crystals and containing coarse crystals having a crystal grain diameter of more than 100 nm, the relative magnetic permeability was lower than that of Example (Sample No. 3) in which the fine structure of the large particles was a structure made of nanocrystals.

Experimental Example 7

In Experimental Example 7, regarding Samples No. 3 and 3a, the mixing ratio of the soft magnetic metal powder most of which eventually became large particles to the soft magnetic metal powder most of which eventually became small particles was changed to have the S1:S2 shown in Table 7. Unlike Experimental Examples 1 to 6, a molding pressure was unified to 4 t/cm$^2$, so as to evaluate the change in the ratio of the magnetic material area (filling rate) when S1:S2 was changed. Other points were carried out under the same conditions. Results are shown in Table 7.

pressure. The larger the ratio of S2 to S1, the better the withstand voltage property. However, the larger the ratio of S2 to S1, the lower the ratio of the magnetic material area (filling rate), and the lower the relative magnetic permeability. Therefore, it was confirmed that a filling property was the best when S1:S2 was 8:2.

What is claimed is:
1. A magnetic core comprising:
    large particles observed as soft magnetic particles having a Heywood diameter of 5 μm or more and 25 μm or less; and
    small particles observed as soft magnetic particles having a Heywood diameter of 0.5 μm or more and less than 5 μm in a cross section, wherein
    C1<C2 is satisfied, in which an average circularity of the small particles close to the large particles is C1 and an average circularity of all small particles observed in the cross section including small particles not close to the large particles is C2, and
    the small particles close to the large particles are defined as small particles whose distance from centroids of the small particles to a surface of the large particles is 3 μm or less.

TABLE 7

| Sample No. | Example/ Comparative Example | Mixing method | Average circularity small particles C1 | Average circularity small particles C2 | S1:S2 | Maximum value of Heywood diameter μm | Ratio of magnetic material area % | Relative magnetic permeability | Withstand voltage property V/mm | Withstand voltage property ratio |
|---|---|---|---|---|---|---|---|---|---|---|
| 41a | Comparative Example | Method 1 | 0.823 | 0.823 | 9:1 | 21.2 | 80.2 | 50 | 44 | — |
| 41 | Example | Method 2 | 0.731 | 0.803 | 9:1 | 21.2 | 80.1 | 52 | 102 | 2.3 |
| 3a | Comparative Example | Method 1 | 0.823 | 0.823 | 8:2 | 20.0 | 80.3 | 51 | 54 | — |
| 3 | Example | Method 2 | 0.731 | 0.803 | 8:2 | 20.0 | 82.1 | 55 | 121 | 2.2 |
| 42a | Comparative Example | Method 1 | 0.823 | 0.823 | 6:4 | 20.2 | 79.4 | 48 | 61 | — |
| 42 | Example | Method 2 | 0.731 | 0.803 | 6:4 | 20.3 | 79.3 | 52 | 121 | 2.0 |
| 43a | Comparative Example | Method 1 | 0.823 | 0.823 | 5:5 | 20.1 | 77.2 | 47 | 62 | — |
| 43 | Example | Method 2 | 0.731 | 0.803 | 5:5 | 21.2 | 77.4 | 51 | 132 | 2.1 |
| 44a | Comparative Example | Method 1 | 0.823 | 0.823 | 4:6 | 20.3 | 76.4 | 46 | 63 | — |
| 44 | Example | Method 2 | 0.731 | 0.803 | 4:6 | 20.1 | 76.3 | 50 | 143 | 2.3 |
| 45a | Comparative Example | Method 1 | 0.823 | 0.823 | 2:8 | 20.3 | 75.3 | 45 | 69 | — |
| 45 | Example | Method 2 | 0.731 | 0.803 | 2:8 | 20.1 | 75.3 | 49 | 151 | 2.2 |
| 46a | Comparative Example | Method 1 | 0.823 | 0.823 | 1:9 | 20.2 | 74.3 | 44 | 72 | — |
| 46 | Example | Method 2 | 0.731 | 0.803 | 1:9 | 20.1 | 74.2 | 48 | 162 | 2.3 |

According to Table 7, Examples and Comparative Examples in which S1:S2 are identical to each other are compared. Each Example satisfying C1<C2 had an improved withstand voltage property as compared with each Comparative Example similar to each Example except for satisfying C1=C2.

According to Table 7, when the molding pressure was the same, the ratio of the magnetic material area (filling rate) was high when S1:52 was 8:2. The relative magnetic permeability was highest when S1:52 was 8:2. The larger the ratio of S2 to S1, the better the withstand voltage property. However, the larger the ratio of S2 to S1, the lower the ratio of the magnetic material area and the lower the relative magnetic permeability.

For each Example in Table 7, it was confirmed that the molding pressure was changed between 1 to 8 t/cm$^2$ to change the filling rate. When comparing Examples prepared at the same molding pressure, the ratio of the magnetic material area (filling rate) and the relative magnetic permeability were high when S1:S2 was 8:2 at any molding 2. The magnetic core according to claim 1, wherein
    an area ratio of all the soft magnetic particles in the cross section is 75% or more and 90% or less.
3. The magnetic core according to claim 1, wherein
    in the cross section, a maximum value of a Heywood diameter of soft magnetic particles other than the large particles and the small particles is 50 μm or less.
4. The magnetic core according to claim 1, further comprising a resin.
5. The magnetic core according to claim 4, wherein
    a portion other than magnetic materials is occupied by the resin, or the resin and voids in the cross section.
6. The magnetic core according to claim 1, wherein
    an average elliptic circularity of the large particles in the cross section is 0.930 or more.
7. The magnetic core according to claim 1, wherein
    the large particles are amorphous.
8. The magnetic core according to claim 1, wherein
    the large particles contain nanocrystals.

9. The magnetic core according to claim 1, wherein
a content of Fe in the small particles is 50 at % or more and 100 at % or less.

10. The magnetic core according to claim 1, wherein
the small particles contain at least Fe and at least one selected from Si and Ni, and a total content of Fe, Si and Ni in the small particles is 50 at % or more and 100 at % or less.

11. The magnetic core according to claim 10, wherein the content of Fe is 15 at % or more and 95 at % or less, and the total content of Si and Ni is 3 at % or more and 90 at % or less.

12. A magnetic component comprising: the magnetic core according to claim 1.

13. An electronic device comprising: the magnetic core according to claim 1.

* * * * *